(12) United States Patent
Coscarella

(10) Patent No.: US 8,578,961 B2
(45) Date of Patent: Nov. 12, 2013

(54) LOW PROFILE BACKWATER VALVE

(76) Inventor: Gabe Coscarella, Edmonton (CA)

( * ) Notice: Subject to any disclaimer, the term of this patent is extended or adjusted under 35 U.S.C. 154(b) by 444 days.

(21) Appl. No.: 12/502,160

(22) Filed: Jul. 13, 2009

(65) Prior Publication Data

US 2010/0078083 A1    Apr. 1, 2010

(30) Foreign Application Priority Data

Oct. 10, 2008    (CA) .................................... 2640496

(51) Int. Cl.
    *F16K 31/18*    (2006.01)

(52) U.S. Cl.
    USPC .............. 137/448; 137/409; 137/423; 405/96

(58) Field of Classification Search
    USPC ........... 137/408, 409, 423, 527, 527.2, 527.6, 137/527.8, 520, 521, 448; 251/87, 177, 251/298, 127; 405/39, 96, 97
    See application file for complete search history.

(56) References Cited

U.S. PATENT DOCUMENTS

| | | |
|---|---|---|
| 194,676 A | 8/1877 | Hansen |
| 199,696 A | 1/1878 | Dikeman |
| 217,431 A | 7/1879 | Tilton |
| 271,644 A | 2/1883 | Lowrie |
| 289,108 A | 11/1883 | Johnson |
| 384,396 A | 6/1888 | Shepherd |
| 384,397 A | 6/1888 | Shepherd |
| 424,580 A | 4/1890 | Shepherd |
| 500,453 A | 6/1893 | Wright |
| 1,031,567 A | 7/1912 | Miller |
| 1,113,648 A | 10/1914 | Karlson |
| 1,183,692 A | 5/1916 | Strout |
| 1,205,199 A | 11/1916 | Healy |
| 1,448,898 A * | 3/1923 | Zehringer .................. 137/527.8 |
| 1,464,614 A | 8/1923 | Nacey |
| 1,584,666 A | 5/1926 | Shockley |
| 1,606,396 A | 11/1926 | Blom |
| 1,612,195 A | 12/1926 | Kirchhan |
| 1,673,619 A * | 6/1928 | Culp ............................. 137/527 |
| 1,770,637 A * | 7/1930 | Wagner ........................ 137/448 |
| 1,795,669 A * | 3/1931 | Northrop .................. 137/527.8 |
| 1,861,397 A | 5/1932 | Khun |
| 1,864,443 A | 6/1932 | Khun |

(Continued)

FOREIGN PATENT DOCUMENTS

| | | |
|---|---|---|
| CA | 2114602 C | 7/1997 |
| CA | 2302455 A1 | 9/2001 |

OTHER PUBLICATIONS

"Backwater Valve Flapper Type," Z1091 (Product Information Sheet), Zurn Industries, Inc., Oct. 30, 2003, 1 page.

*Primary Examiner* — Craig Schneider
*Assistant Examiner* — Craig J Price
(74) *Attorney, Agent, or Firm* — Christensen O'Connor Johnson Kindness PLLC

(57) ABSTRACT

A low profile backwater valve includes a hollow valve body having an inlet, an outlet, and a bottom. A pivoting valve member is pivotally movable between a normally open position along the bottom of the valve body and a closed position sealing the inlet. The valve member has a hinge end, a remote end, and opposed sides. A float is positioned as an appendage along at least one of the opposed sides of the valve member, such that the float adds buoyancy to the valve member causing the valve member to float into the closed position in the presence of a backflow.

7 Claims, 3 Drawing Sheets

(56) References Cited

U.S. PATENT DOCUMENTS

| | | | | |
|---|---|---|---|---|
| 1,924,498 | A | 8/1933 | House | |
| 2,013,188 | A | 9/1935 | Reinhardt | |
| 2,048,088 | A * | 7/1936 | Wagner | 137/520 |
| 2,266,930 | A | 12/1941 | Watson | |
| 2,290,461 | A | 7/1942 | Young | |
| 2,292,509 | A | 8/1942 | Carson | |
| 2,628,056 | A | 2/1953 | Fuller | |
| 2,638,178 | A | 5/1953 | McRill | |
| 2,695,072 | A | 11/1954 | Hauslein | |
| 2,877,792 | A | 3/1959 | Tybus | |
| 2,928,410 | A | 3/1960 | Vecchio | |
| 3,074,427 | A | 1/1963 | Wheeler | |
| 3,176,707 | A | 4/1965 | Wilson | |
| 3,270,770 | A * | 9/1966 | Wilson | 137/448 |
| 3,327,732 | A | 6/1967 | Deve | |
| 3,395,721 | A | 8/1968 | Shibata | |
| 3,448,465 | A * | 6/1969 | Morrow et al. | 137/527.8 |
| 3,538,514 | A | 11/1970 | Schimert | |
| 3,566,500 | A | 3/1971 | Simon | |
| 3,626,148 | A | 12/1971 | Woytowich | |
| 3,626,521 | A | 12/1971 | Delco | |
| 3,781,920 | A | 1/1974 | Browne | |
| 3,797,811 | A | 3/1974 | Jullien | |
| 3,824,629 | A | 7/1974 | Shiley | |
| 3,933,444 | A | 1/1976 | Kilgore | |
| 3,948,282 | A | 4/1976 | Yano | |
| 3,959,828 | A * | 6/1976 | Acevedo | 4/393 |
| 3,974,654 | A | 8/1976 | Mirto, Jr. | |
| 4,022,421 | A * | 5/1977 | Carlin | 137/559 |
| 4,064,902 | A | 12/1977 | Swenson | |
| 4,117,860 | A * | 10/1978 | Carlin | 137/521 |
| 4,311,163 | A | 1/1982 | Langevin | |
| 4,314,583 | A | 2/1982 | Peterson | |
| 4,324,506 | A | 4/1982 | Steinke | |
| 4,391,289 | A | 7/1983 | Adams | |
| 4,475,571 | A | 10/1984 | Houston, Jr. | |
| 4,503,881 | A * | 3/1985 | Vecchio | 137/448 |
| 4,544,027 | A | 10/1985 | Goldberg | |
| 4,605,031 | A | 8/1986 | Gründ | |
| 4,787,103 | A | 11/1988 | Endo | |
| 4,844,610 | A | 7/1989 | North, Jr. | |
| 4,891,994 | A | 1/1990 | Barba | |
| 4,942,898 | A | 7/1990 | Osowski | |
| 4,961,444 | A | 10/1990 | Morgan et al. | |
| 5,020,567 | A | 6/1991 | Proulx | |
| 5,123,444 | A * | 6/1992 | Persson et al. | 137/579 |
| 5,234,018 | A | 8/1993 | Grachal | |
| 5,398,735 | A | 3/1995 | Lagache | |
| 5,406,972 | A | 4/1995 | Coscarella | |
| 5,469,881 | A | 11/1995 | Phan | |
| 5,669,405 | A | 9/1997 | Engelmann | |
| 5,819,791 | A | 10/1998 | Chronister | |
| 5,826,609 | A | 10/1998 | Watts | |
| 5,934,313 | A | 8/1999 | Brothers | |
| 5,947,152 | A | 9/1999 | Martin | |
| 6,029,684 | A | 2/2000 | Watts | |
| 6,125,878 | A | 10/2000 | Watts | |
| 6,186,164 | B1 | 2/2001 | Pfeifer | |
| 6,318,404 | B2 | 11/2001 | Coscarella | |
| 6,446,665 | B2 | 9/2002 | Coscarella | |
| 6,499,503 | B2 | 12/2002 | Coscarella | |
| 6,679,283 | B1 | 1/2004 | Coscarella | |
| 7,942,606 | B2 * | 5/2011 | Schafer | 405/39 |

* cited by examiner

LOW PROFILE BACKWATER VALVE

FIELD

The present invention relates to a backwater valve used to prevent a backflow of sewage into a home.

BACKGROUND

U.S. Pat. No. 5,406,972 (Coscarella et al) relates to a backwater valve which prevents a backflow of sewage into a home. This backwater valve needs a minimum amount of clearance space. As a result, there are some installations for which the valve is not suited because there is insufficient clearance space.

SUMMARY

There is provided a low profile backwater valve, comprising a hollow valve body having an inlet, an outlet, and a bottom. A pivoting valve member is pivotally movable between a normally open position along the bottom of the valve body and a closed position sealing the inlet. The valve member has a hinge end, a remote end, and opposed sides. A float is positioned as an appendage along at least one of the opposed sides of the valve member, such that the float adds buoyancy to the valve member causing the valve member to float into the closed position in the presence of a backflow.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
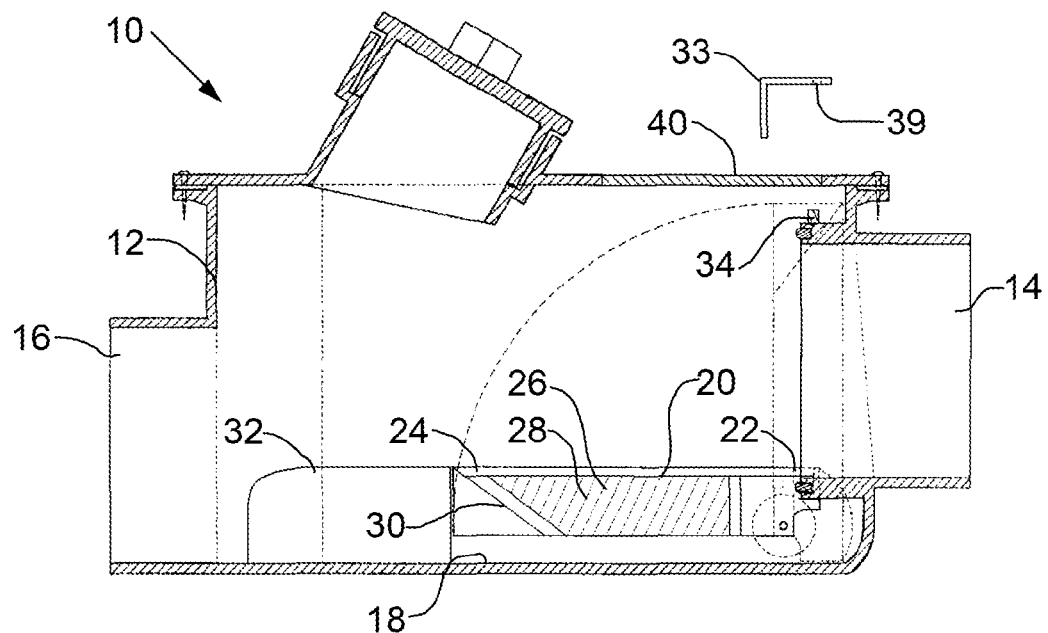
FIG. 1 is a side elevation view in section of a low profile backwater valve.

A low profile backwater valve generally identified by reference numeral 10 will now be described with reference to FIG. 1 through 5.

Figure 2:
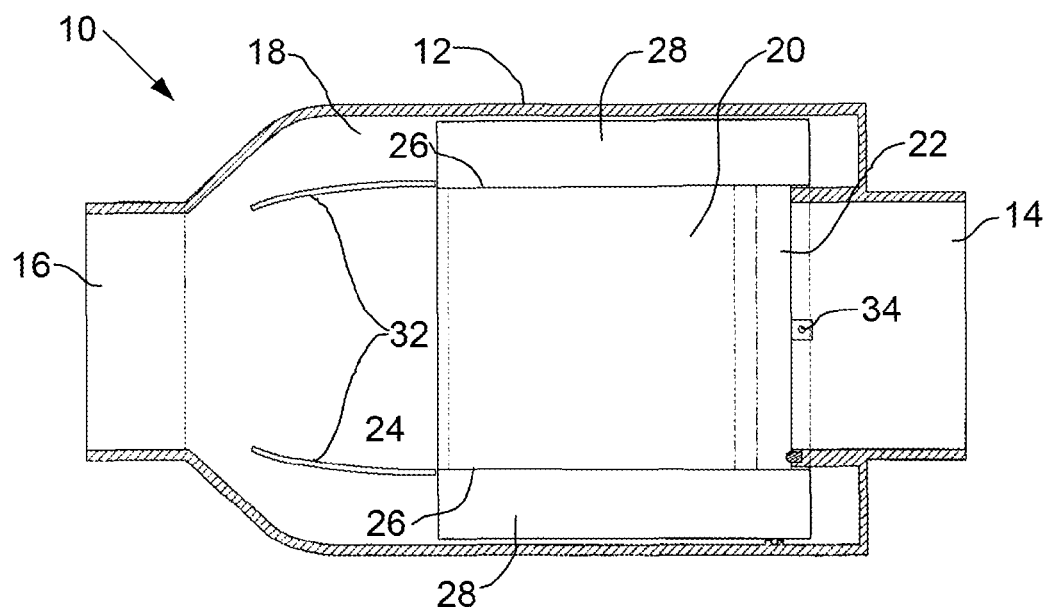
FIG. 2 is a top plan view in section of the low profile backwater valve.
Figure 5:
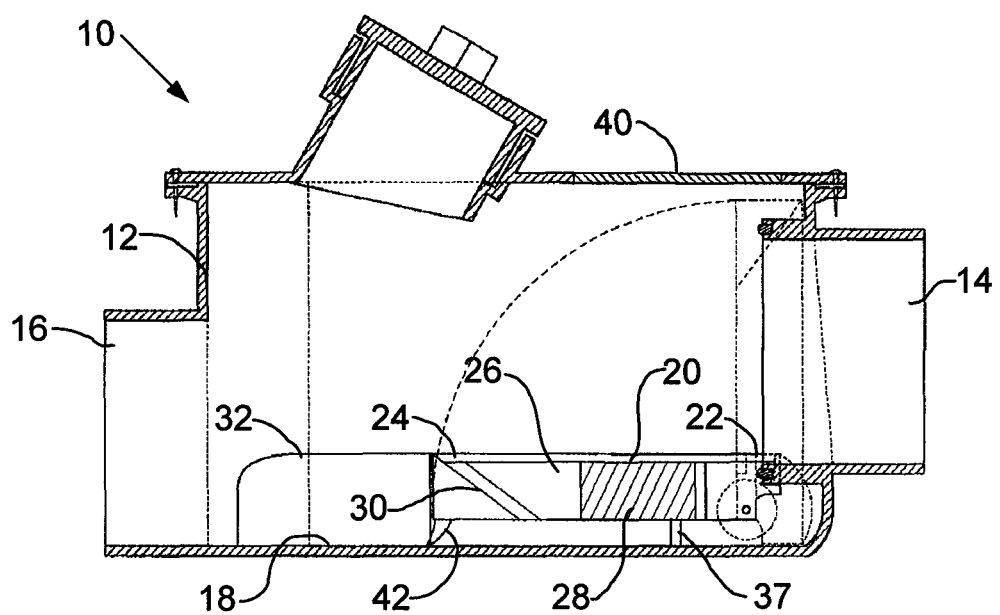
FIG. 5 is a side elevation view in section of a further variation of the low profile backwater valve.

Structure and Relationship of Parts:

Referring to FIG. 1, low profile backwater valve 10 has a hollow valve body 12 having an inlet 14, an outlet 16, and a bottom 18. A pivoting valve member 20 is pivotally movable between a normally open position along bottom 18 of valve body 12 and a closed position sealing inlet 14. Valve member 20 has a hinge end 22, a remote end 24, and opposed sides 26. A float 28 is positioned as an appendage along at least one opposed side 26 of valve body 12. Referring to FIG. 2, floats 28 are preferably positioned along both sides 26. Float 28 adds buoyancy to valve member 20, such that valve member 20 floats into the closed position in the presence of a backflow. Valve member 20 may be made from buoyant material itself, in which case it may not be necessary to provide floats 28. However, it may be desired to enhance the buoyancy of valve member 20 by including other floats. By placing floats 28 on the side, it enables valve member 20 to be designed with a lower profile within valve body 12 than would otherwise be possible. Referring to FIG. 1, in some embodiments, a locking means, such as a locking member 33 as shown, may be provided to lock valve member 20 into the closed position. In the depicted embodiment, locking member 33 is inserted over valve member 20 in the closed position to simultaneously engage the underside of the bottom side of valve member 20 and a pin 34 on valve body 12 to hold valve member 20 in position. Pin 34 is engaged by a pin receiver 39 carried by locking member 33. Referring again to FIG. 1, the portion of float 28 at remote end 24 of valve member 20 preferably defines an inclined plane 30, such that the force of a backflow striking inclined plane 30 lifts valve member 20 toward the closed position. Referring to FIG. 5, inclined plane 30 may also be independent of float 28. For example, inclined plane 30 may be an outward extension of, or otherwise attached to valve member 20, with floats either positioned away from inclined plane 30 as shown, or not included on sides 26 of valve member 20. In some embodiments, where valve member 20 is sufficiently buoyant, it may not be necessary to include floats 28.

Figure 3:
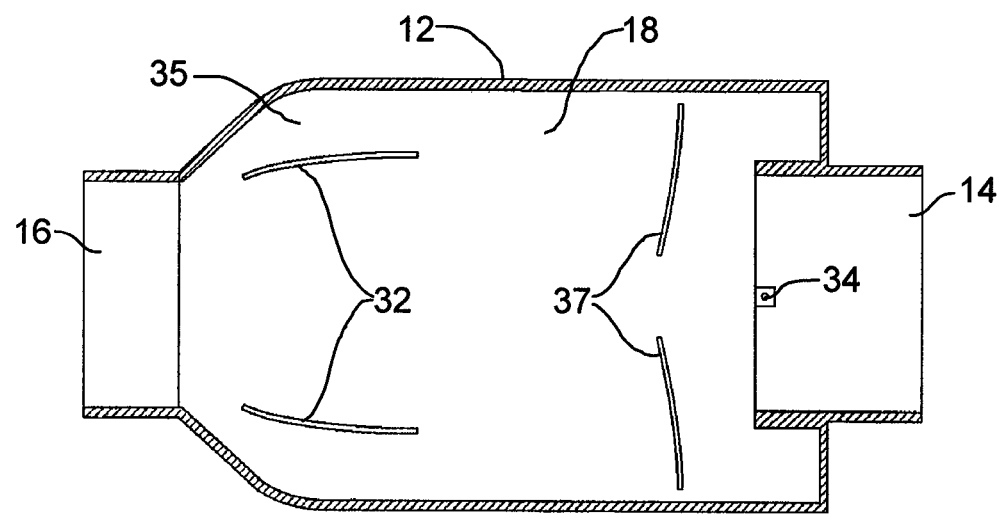
FIG. 3 is a top plan view of a variation of the low profile backwater valve with the valve body removed.
Figure 4:
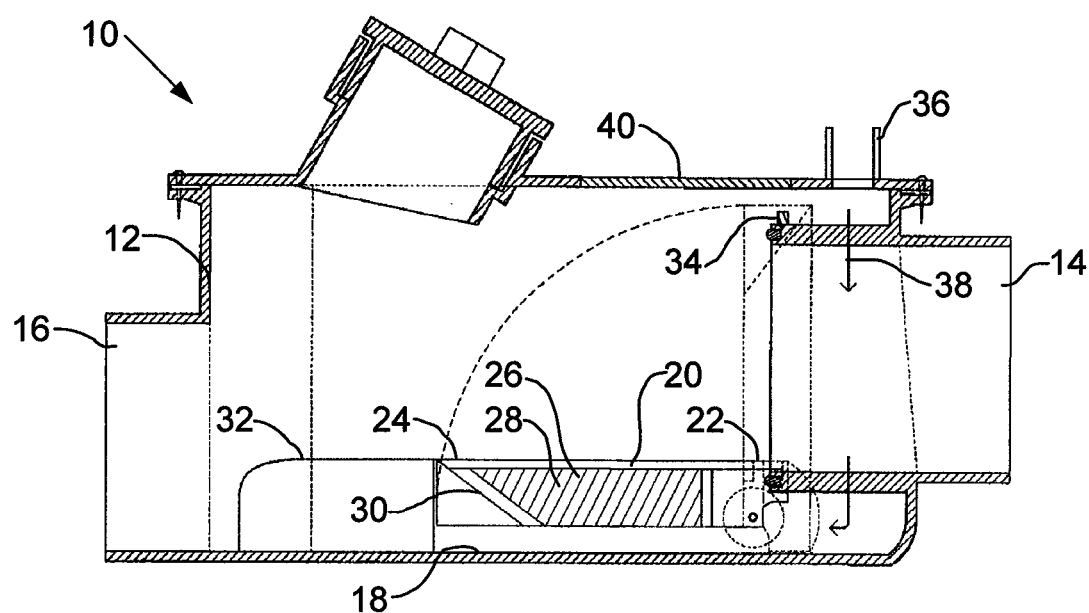
FIG. 4 is a side elevation view of a further variation of the low profile backwater valve.

It has been found that debris and other contaminants can cause difficulties in the operation of backwater valve 10. To counter this, certain features may be used. Referring to FIG. 3, baffles 32 may extend vertically from bottom 18 of valve body 12 to define flow channels 35 directing flow toward float 28. Referring to FIG. 4, a hose coupling 36 may be provided on valve body 12 with a passage indicated by arrows 38 to flush underneath valve member 20 to remove debris that might collect between valve member 20 and bottom 18 of valve body 12. Referring to FIG. 3, baffles or dams 37 extend vertically from the bottom of the valve body protecting the hinge end of the valve member from contamination. Alternatively, referring to FIG. 5, baffles 37 may extend from the bottom of valve body 20. In addition to baffles 32 and 37, valve member 20 may carry a seal 42 at remote end 24 to help prevent any debris carried by water from flowing under valve member 20. Referring to FIG. 4, valve body 12 may also have a transparent top 40 to facilitate visual inspection.

Operation:

Referring to FIGS. 1 and 2, low profile backwater valve 10 is installed to allow water to flow from inlet 14 to outlet 16. If the flow of water reverses to flow from outlet 16 to inlet 14, the flow is directed by baffles 32 toward inclined plane 30 on float 28. The flow against plane 30, as well as the buoyancy of floats 28, causes valve member 20 to rise and ultimately close to prevent flow out of inlet 14. The actual combination of these forces that closes valve member 20 will depend on the rate of flow of backwater. For example, if the rate of flow is high, the force of impact on inclined plane 30 may be sufficient to cause valve member 20 to close, or merely enough to lift valve member 20 partially. If the rate of flow is slower, the buoyancy of valve member 20 will cause valve member 20 to close.

Referring to FIG. 3, bottom 18 is contoured and provided with baffles 32 to direct the flow of water to close valve member 20 as well as baffles 37 to allow water that may carry debris and contaminants, such as dirt, to drain away from valve member 20 and hinge end 22. This helps prevent valve member 20 from accumulating debris between valve member 20 and bottom 18, or by causing hinge end 22 to become immobilized. Referring to FIG. 4, transparent top 40 allows a visual inspection of backwater valve 10. If it becomes apparent from a visual inspection or otherwise that valve member 20 is not operating properly, hose coupling 36 allows a cleaning fluid to be flushed through to clean backwater valve 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A low profile backwater valve, comprising:
   a hollow valve body having an inlet defined by a vertical surface, an outlet, and a bottom;
   a pivoting valve member pivotally movable between a normally open position along the bottom of the valve body and a closed, vertical position sealing the inlet, the valve member having a peripheral edge comprising a hinge end, a remote end, and opposed sides; and
   a float positioned as an appendage along and abutting at least one of the opposed sides of the valve member, such that the float extends outward from the valve member and such that the float adds buoyancy to the valve member causing the valve member to float upward into the closed position in the presence of a backflow.

2. The low profile backwater valve of claim 1, wherein the remote end of the valve member defines an inclined plane, such that a force of a backflow striking the inclined plane lifts the valve member toward the closed position.

3. The low profile backwater valve of claim 1, wherein baffles extending vertically from the bottom of the valve body define flow channels directing flow toward the float, the baffles being spaced from the valve member in the open position.

4. The low profile backwater valve of claim 1, wherein a locking member is provided to lock the valve member into the closed position.

5. The low profile backwater valve of claim 1, wherein a hose coupling is provided on the valve body with a passage to facilitate flushing underneath the valve member to remove debris.

6. The low profile backwater valve of claim 1, wherein the valve body has a transparent top to facilitate visual inspection.

7. The low profile backwater valve of claim 1, wherein dams extend vertically from the bottom of the valve body protecting the hinge end of the valve member from contamination.

* * * * *

UNITED STATES PATENT AND TRADEMARK OFFICE
CERTIFICATE OF CORRECTION

| | | |
|---|---|---|
| PATENT NO. | : 8,578,961 B2 | Page 1 of 1 |
| APPLICATION NO. | : 12/502160 | |
| DATED | : November 12, 2013 | |
| INVENTOR(S) | : Coscarella | |

It is certified that error appears in the above-identified patent and that said Letters Patent is hereby corrected as shown below:

On the title page item [30], "Oct. 10, 2008" should read --Oct. 1, 2008--

Signed and Sealed this
Twelfth Day of January, 2016

Michelle K. Lee
*Director of the United States Patent and Trademark Office*